UNITED STATES PATENT OFFICE.

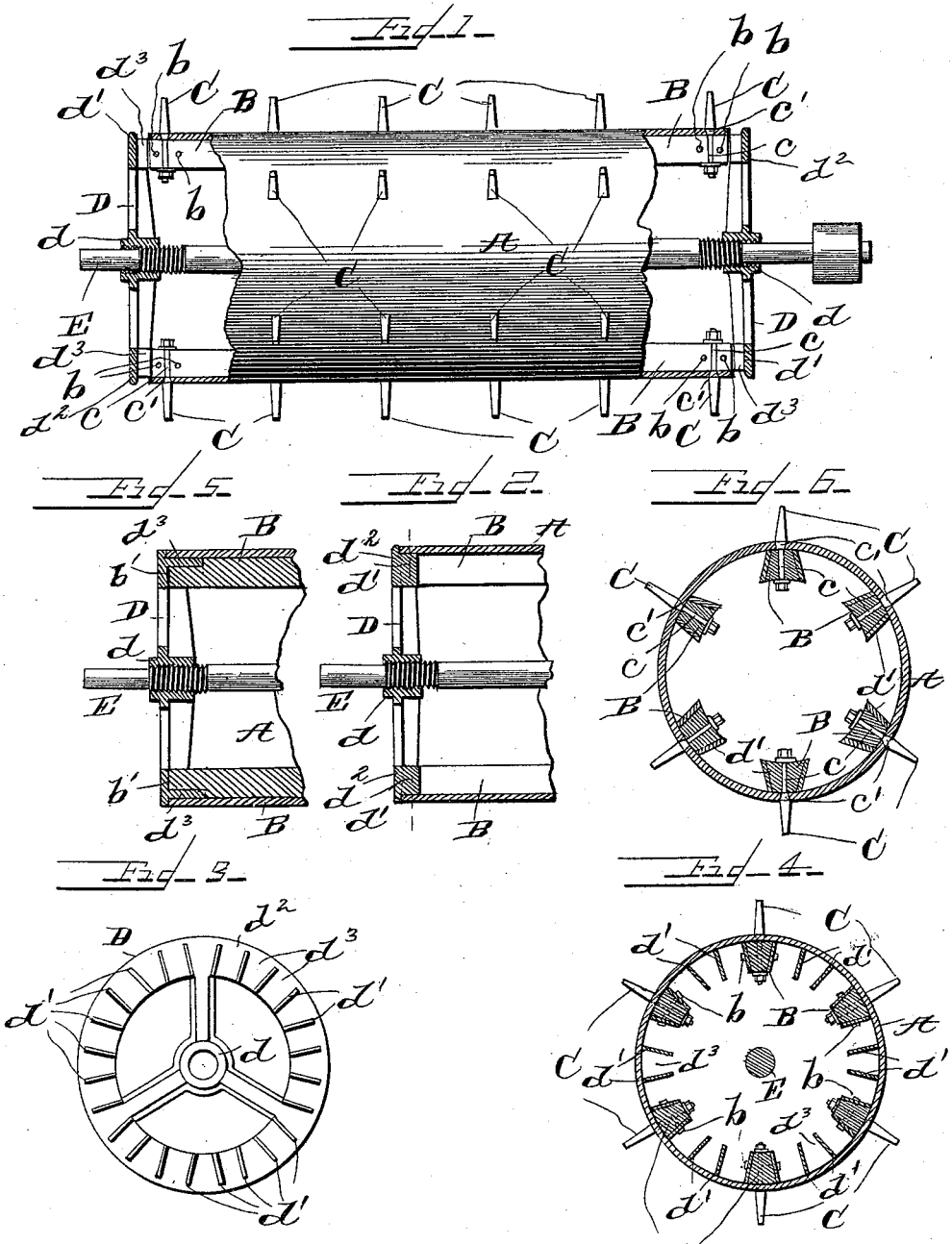

WILLIAM W. DINGEE, OF RACINE, WISCONSIN.

THRASHING-CYLINDER.

SPECIFICATION forming part of Letters Patent No. 493,155, dated March 7, 1893.

Application filed October 6, 1892. Serial No. 448,045. (No model.)

*To all whom it may concern:*

Be it known that I, WILLIAM W. DINGEE, a citizen of the United States, residing at Racine, in the county of Racine and State of Wisconsin, have invented certain new and useful Improvements in Thrashing-Cylinders; and I do hereby declare the following to be a full, clear, and exact description of the invention, such as will enable others skilled in the art to which it appertains to make and use the same.

My invention is an improvement in cylinders for thrashing machines and consists in the novel features of construction and combination of parts hereinafter fully described reference being had to the accompanying drawings which illustrate one form in which I have contemplated embodying my invention, and my said invention is fully disclosed in the following description and claims.

Referring to the said drawings: Figure 1 represents an elevation of a thrashing cylinder constructed according to my invention, broken away at each end to show the interior. Fig. 2 is a sectional view of one end of the said cylinder. Fig. 3 is a detail view of one of the cylinder heads. Fig. 4 represents a transverse section of the cylinder and one of the heads. Figs. 5 and 6 are views of slightly modified forms of cylinder heads.

The object of my invention is to provide a strong, light and economical construction of thrashing cylinder in which access may be had easily to the tooth securing devices on the inside of the cylinder to adjust the same or for the insertion of new teeth.

In carrying my invention into effect I employ a hollow integral cylindrical drum or shell A preferably formed of wrought iron tubing. This drum or shell is provided with a suitable number of thrashing teeth and I prefer to secure them to the shell in the following manner. The interior of the said shell A is provided with a series of longitudinal reinforcing ribs or staves B of wood and the teeth C are arranged in rows and extend through the metal shell and staves as shown in the drawings, the stems $c$ of the teeth being provided with tapering shoulders $c'$ to engage counter-sink apertures in the metal shell, and having screw threaded portions provided with nuts and washers as usual for securing them in position. I also prefer to provide each of the staves B with cross bolts $b\ b$ adjacent to the teeth to prevent the staves from splitting.

D D represent the heads of the cylinder which are made of metal and may be solid if desired but I prefer to form them open with radial spokes connecting the sleeves $d$, with the rims as this construction is much lighter. Each of the heads D has its rim provided with a turned cylindrical portion $d'$ which fits snugly within the shell or drum A, and said cylindrical portion terminates in an annular flange $d^2$ which prevents the head from being forced too far into the shell.

The rim of each head D is provided with a series of sockets or recesses $d^3$ to receive the ends of the staves B as the heads are forced into the cylinder. This construction prevents the heads from turning with respect to the cylinders. The apertures of the central sleeves or collars of the heads, are provided with right and left screw threads respectively and the supporting driving shaft E for the cylinder is also provided adjacent to either end with left and right screw threads respectively. When the cylinder is put together the heads D are placed in the positions shown in Fig. 1, and the shaft E is rotated in a direction to cause the heads D D to be drawn into the shell A until they are stopped by the flanges $d^2$. The cylinder will then be so mounted in the machine with which it is to be used that the rotation of the shaft E will tend to draw the heads tighter into the shell. When it is desired to have access to the interior of the shell to adjust the tooth securing devices or to replace broken teeth the shaft E will be turned in a direction to unscrew it from the heads D while the shell A is held stationary. This will force the heads outwardly and give access to the interior of the shell.

In the form of cylinder shown and described no strengthening hoops or bands are employed, the whole strain on the teeth being borne by the shell and the staves to which the teeth are secured. I may if I desire provide means for distributing the strain so that part of it shall be borne by the heads D D.

In Fig. 5 I have shown the rim of each head provided with a solid annular flange $d^3$ which is engaged by off set portions or shoulders $b'$ of the staves so that part of the centrifugal strain upon the staves and shell is transmitted to the heads, which assist in strengthening the construction.

In Fig. 6 I have shown the head provided with sockets each having its side walls closer together adjacent to the cylinder and wider apart toward the center of the head, and the ends of the staves which engaged these tapered sockets are similarly formed so that the centrifugal strain upon the staves and the shell is transmitted to said sockets and to the heads.

I do not desire to be limited to the exact details of construction herein shown and described as variations may be made therein without departing from the spirit of my invention.

What I claim, and desire to secure by Letters Patent, is—

1. In a thrashing cylinder the combination with the hollow metallic cylindrical shell provided with the longitudinal reinforcing staves and thrashing teeth engaging said shell and staves, of the supporting shaft, the heads for engaging the ends of said shell each having sockets for engaging said staves and portions for engaging the inner face and end of said shell, and devices for drawing said heads into said shell whereby the engagement of said staves with the sockets of the heads will prevent the heads from rotating while being drawn in, substantially as described.

2. In a thrashing cylinder the combination with the hollow metallic cylindrical shell provided with the reinforcing staves and thrashing teeth, of the supporting shaft provided with oppositely screw threaded portions and the heads provided with oppositely screw threaded apertures to engage the threaded portions of said shaft, and having sockets to engage said staves, portions to engage the inner face of said shell and flanges to engage the end of the shell, the engagement of said heads with the shell and shaft forming the sole connection between said parts, substantially as described.

3. In a thrashing cylinder the combination with the wrought iron hollow cylindrical shell provided with thrashing teeth, of a supporting shaft provided with oppositely screw threaded portions, a pair of heads having oppositely screw threaded central apertures to engage said shaft, and having portions to engage the inner face and end of said shell, whereby the continued revolution of said shaft will tend to draw the heads more tightly into the ends of said shell, substantially as described.

4. A thrashing cylinder comprising a hollow cylinder shell provided interiorly with the longitudinal staves and thrashing teeth secured to said shell and staves the cylinder heads having portions adapted to fit within said shell provided with sockets for engaging the ends of said staves, said heads having portions engaging said staves between them and the shell for preventing the outward movement of the staves and shell and the supporting shaft engaging said heads, substantially as described.

5. In a thrashing cylinder the combination with the hollow cylindrical shell of the longitudinal staves secured thereto, the teeth engaging the said shell and staves, devices for engaging said staves and holding them against outward radial movement, and a supporting shaft secured to revolve with said shell, substantially as described.

In testimony whereof I affix my signature in presence of two witnesses.

WILLIAM W. DINGEE.

Witnesses:
CHAS. H. MINER,
GEO. L. EDDY.